United States Patent
Kouno et al.

(10) Patent No.: US 9,333,719 B2
(45) Date of Patent: May 10, 2016

(54) TIRE MANUFACTURING METHOD AND TIRE

(75) Inventors: Yoshihide Kouno, Kodaira (JP); Seiji Kon, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/390,779

(22) PCT Filed: Aug. 9, 2010

(86) PCT No.: PCT/JP2010/063502
§ 371 (c)(1),
(2), (4) Date: Feb. 16, 2012

(87) PCT Pub. No.: WO2011/021526
PCT Pub. Date: Feb. 24, 2011

(65) Prior Publication Data
US 2012/0145296 A1 Jun. 14, 2012

(30) Foreign Application Priority Data
Aug. 20, 2009 (JP) ................................. 2009-191207

(51) Int. Cl.
*B60C 9/18* (2006.01)
*B60C 5/01* (2006.01)
(Continued)

(52) U.S. Cl.
CPC ............ *B29D 30/08* (2013.01); *B29D 30/0601* (2013.01); *B29D 30/1607* (2013.01); *B29D 30/542* (2013.01); *B29D 30/58* (2013.01);
(Continued)

(58) Field of Classification Search
CPC ........ B60C 9/18; B60C 9/1835; B60C 9/185; B60C 5/01
See application file for complete search history.

(56) References Cited

U.S. PATENT DOCUMENTS 3,888,291 A * 6/1975 Herzlich et al. ............ 152/209.5
4,152,186 A * 5/1979 Shibata .......................... 156/123
(Continued)

FOREIGN PATENT DOCUMENTS

DE        3818567   * 12/1989
EP      0 425 299 A2    5/1991
(Continued)

OTHER PUBLICATIONS

Machine translation of JP 2005-254993, 2005.*
(Continued)

*Primary Examiner* — Justin Fischer
(74) *Attorney, Agent, or Firm* — Sughrue Mion, PLLC

(57) ABSTRACT

To reduce the manufacturing cost of a tire that uses a thermoplastic material for a tire frame member.

A tire manufacturing method includes: using a thermoplastic material to form a tire frame member (12); disposing cushion rubber (14) (unvulcanized rubber) on an outer peripheral surface of the tire frame member (12); further disposing vulcanized or semi-vulcanized tread rubber (16) on a tire diameter direction outer side of the cushion rubber (14); covering the tread rubber (16), the cushion rubber (14), and at least the tread rubber (16) side of the tire frame member (12) in an envelope, so as to push the tread rubber (16) against the tire frame member (12) side, to configure a provisionally assembled article; and accommodating the provisionally assembled article inside a container and heating the inside of the container to perform vulcanization to thereby adhere the tread rubber (16) to the tire frame member (12).

4 Claims, 18 Drawing Sheets

(51) Int. Cl.

| | | |
|---|---|---|
| *B29D 30/08* | (2006.01) | |
| *B29D 30/06* | (2006.01) | |
| *B29D 30/16* | (2006.01) | |
| *B29D 30/54* | (2006.01) | |
| *B29D 30/58* | (2006.01) | |
| *B60C 5/00* | (2006.01) | |
| *B60C 9/14* | (2006.01) | |
| *B60C 19/08* | (2006.01) | |
| *B29D 30/52* | (2006.01) | |

(52) U.S. Cl.
CPC . *B60C5/007* (2013.01); *B60C 5/01* (2013.01); *B60C 9/14* (2013.01); *B60C 19/08* (2013.01); *B29D 2030/526* (2013.01); *Y10T 152/10495* (2015.01)

(56) References Cited

U.S. PATENT DOCUMENTS

| | | | |
|---|---|---|---|
| 4,315,536 A | | 2/1982 | Knipp et al. |
| 5,015,315 A | * | 5/1991 | Nakasaki ............... 156/130.7 |
| 2008/0103287 A1 | * | 5/2008 | Chino et al. ............... 528/421 |

FOREIGN PATENT DOCUMENTS

| | | | |
|---|---|---|---|
| EP | 0 426 389 A2 | | 5/1991 |
| JP | 3-143701 A | | 6/1991 |
| JP | 3-143702 A | | 6/1991 |
| JP | 3-148302 A | | 6/1991 |
| JP | 3-164302 A | | 7/1991 |
| JP | 5-116504 A | | 5/1993 |
| JP | 6-286419 | * | 10/1994 |
| JP | 2005-254993 | * | 9/2005 |
| JP | 2007-69745 A | | 3/2007 |
| JP | 2009-143099 A | | 7/2009 |
| WO | 2004/089656 A1 | | 10/2004 |

OTHER PUBLICATIONS

International Search Report for PCT/JP2010/063502 dated Oct. 12, 2010.
Chinese Office Action issued in Chinese Application No. 201080036681.7 dated Oct. 9, 2013.
Extended European Search Report, dated Jan. 20, 2014, issued in European Patent Application No. 10809871.6.
Japanese Office Action issued in Japanese Application No. 2011-527642 dated Aug. 19, 2014.

* cited by examiner

TIRE MANUFACTURING METHOD AND TIRE

CROSS REFERENCE TO RELATED APPLICATIONS

This application is a National Stage of International Application No. PCT/JP2010/063502 filed Aug. 9, 2010, claiming priority based on Japanese Patent Application No. 2009-191207 filed Aug. 20, 2009, the contents of all of which are incorporated herein by reference in their entirety.

TECHNICAL FIELD

The present invention relates to a tire manufacturing method and a tire.

BACKGROUND ART

There has been disclosed a tire that is attached to a rim. The tire has a tire body that comprises a pair of semi-annular tire pieces. Each of the semi-annular tire pieces is equipped with one bead in which a bead core is embedded, a side wall that is continuous with the bead, and an overhang piece that is continuous with the side wall. The semi-annular tire pieces are integrally molded out of a polymer material and can form a tread bottom portion as a result of the overhang pieces being joined to each other. The tire has a structure where at least one reinforcing layer, in which a reinforcing cord is helically wound continuously in a tire circumferential direction on a tire radial radiation outer surface of the tread bottom portion of the tire body, and tread rubber, which is additionally attached to the outer side of the reinforcing layer, are integrated with the tire body by vulcanization inside a vulcanizing mold (see patent document 1).

PRIOR ART DOCUMENTS

Patent Documents

Patent Document 1: Japanese Patent Application Laid-Open (JP-A) No. 3-143701

SUMMARY OF INVENTION

Technical Problem

Conventionally, tires comprising rubber, organic fiber materials, and steel members have been known, but from the standpoints of making the tires lightweight and easy to recycle, there is a demand to use thermoplastic materials such as thermoplastic elastomers or thermoplastic resins for the tire frame member. As a technique for manufacturing a tire frame member that comprises such a thermoplastic material, a technique that uses a vulcanizing mold such as in the above-described conventional example to integrate the tire frame member and the tread rubber is known.

However, in methods using a vulcanizing mold, a large-scale and expensive vulcanizing machine and various molds corresponding to tire sizes become necessary.

In consideration of the above-described facts, it is an object of the present invention to reduce the manufacturing cost of a tire that uses a thermoplastic material for a tire frame member.

Solution to Problem

A first aspect (a tire manufacturing method) includes: using a thermoplastic material to form a tire frame member; disposing unvulcanized rubber on an outer peripheral surface of the tire frame member; further disposing vulcanized or semi-vulcanized tread rubber on a tire diameter direction outer side of the unvulcanized rubber; covering the tread rubber, the unvulcanized rubber, and at least the tread rubber side of the tire frame member with an envelope to configure a provisionally assembled article; and accommodating the provisionally assembled article inside a container and performing heating inside the container to thereby adhere the tread rubber to the tire frame member.

In a second aspect, the tire manufacturing method pertaining to the first aspect further includes pressurizing the inside of the container when performing vulcanization inside the container.

In a third aspect, the tire manufacturing method pertaining to the first aspect or the second aspect further includes providing a vulcanized rubber layer in at least part of a region of the outer peripheral surface of the tire frame member within which the tread rubber is adhered and disposing the unvulcanized rubber at least between the tread rubber and the rubber layer.

In a fourth aspect, in the tire manufacturing method pertaining to any one of the first aspect to the third aspect, the rubber layer is formed by extending side rubber that is disposed at a side portion of the tire frame member as far as the outer peripheral surface of the tire frame member.

In an invention of a fifth aspect, the tire manufacturing method pertaining to any one of the first aspect to the fourth aspect further includes disposing concavo-convex portions beforehand on the outer peripheral surface of the tire frame member so that the unvulcanized rubber fits together with the concavo-convex portions after vulcanization.

A sixth aspect (a tire) is manufactured by a method including: using a thermoplastic material to form a tire frame member; disposing unvulcanized rubber on an outer peripheral surface of the tire frame member; further disposing vulcanized or semi-vulcanized tread rubber on a tire diameter direction outer side of the unvulcanized rubber; and performing heating in a state where the tread rubber, the unvulcanized rubber, and at least the tread rubber side of the tire frame member have been covered with an envelope to thereby adhere the tread rubber to the tire frame member.

A seventh aspect is a tire wherein a tire frame member is formed using a thermoplastic material, a cord extending in a tire circumferential direction is placed in the tire frame member, cushion rubber is disposed on an outer peripheral surface of the tire frame member, and tread rubber is further disposed on a tire diameter direction outer side of the cushion rubber.

In an eighth aspect, in the tire pertaining to the seventh aspect, an adhesive is disposed between the outer peripheral surface of the tire frame member and the cushion rubber.

In a ninth aspect, in the tire pertaining to the seventh aspect, concavo-convex portions are disposed beforehand on the outer peripheral surface of the tire frame member, and the unvulcanized rubber fits together with the concavo-convex portions after vulcanization.

Here, as the thermoplastic material, a thermoplastic resin, a thermoplastic elastomer (TPE) or the like can be used, but it is preferred that a thermoplastic elastomer be used considering elasticity during travel and formability during manufacture.

Examples of thermoplastic elastomers include polyamide thermoplastic elastomers (TPA), copolyester thermoplastic elastomers (TPC), olefinic thermoplastic elastomers (TPO), styrenic thermoplastic elastomers (TPS), urethane thermoplastic elastomers (TPU), and thermoplastic rubber vulcanizates (TPV) defined in JIS K6418, or other thermoplastic elastomers (TPZ).

Further, examples of thermoplastic resins include urethane resins, olefin resins, vinyl chloride resins, and polyamide resins.

Further, "vulcanized" means a state where the vulcanization degree required of the end product has been reached, and "semi-vulcanized" means a state where the degree of vulcanization is higher than that in an unvulcanized state but the vulcanization degree required of the end product has not been reached.

In the tire manufacturing method pertaining to the first aspect, the tread rubber can be adhered to the tire frame member that uses the thermoplastic material, and the tire can be manufactured, without using a vulcanizing mold in which a large-scale and expensive vulcanizing machine becomes necessary or various molds corresponding to tire sizes. For this reason, the manufacturing cost of the tire that uses the thermoplastic material for the tire frame member can be reduced.

In the tire manufacturing method pertaining to the second aspect, when performing vulcanization inside the container, the inside of the container is not only heated but is also pressurized, so the tread rubber becomes more strongly pushed against the tire frame member side. For this reason, the adhesion of the tread rubber with respect to the tire frame member can be further raised.

In the tire manufacturing method pertaining to the third aspect, by disposing the unvulcanized rubber at least between the tread rubber and the vulcanized rubber layer disposed on the outer peripheral surface of the tire frame member and performing vulcanization, the tread rubber can be easily adhered to the tire frame member that uses the thermoplastic material.

In the tire manufacturing method pertaining to the fourth aspect, the vulcanized rubber layer disposed on the outer peripheral surface of the tire frame member is part of the side rubber, so the number of man-hours can be cut and the manufacturing cost of the tire can be reduced compared to a case where the side rubber is separately disposed.

In the tire manufacturing method pertaining to the fifth aspect, when adhering the tread rubber to the tire frame member by vulcanization, the cushion rubber fits together with the concavo-convex portions on the outer peripheral surface of the tire frame member, so mechanical bonding between the tread rubber and the tire frame member can be ensured, and the joint strength between the tread rubber and the tire frame member can be improved.

The tire pertaining to the sixth aspect can be manufactured without using a vulcanizing mold in which a large-scale vulcanizing machine becomes necessary. For this reason, a tire that uses a thermoplastic material for a tire frame member can be provided at a lost cost.

Considering the heat resistance of a tire frame member that uses a thermoplastic material, a technique that uses a vulcanizing mold to integrate the tire frame member and the tread rubber like in the above-described conventional example is not preferred. In the tire pertaining to the seventh aspect, the cord is placed in and integrated with the tire frame member, so when adhering the tread rubber to the tire frame member, the interference of heat on the tire frame member can be suppressed.

In the tire pertaining to the eighth aspect, the adhesive is disposed between the outer peripheral surface of the tire frame member and the cushion rubber, so the tire frame member and the cushion rubber can be more strongly adhered.

In the tire pertaining to the ninth aspect, the concavo-convex portions disposed on the outer peripheral surface of the tire frame member fit together with the cushion rubber after vulcanization, and mechanical bonding between the tread rubber and the tire frame member is ensured, so the joint strength between the tread rubber and the tire frame member is high.

Advantageous Effects of Invention

As described above, according to the tire manufacturing method and the tire pertaining to the present invention, there is obtained the excellent effect that the manufacturing cost of a tire that uses a thermoplastic material for a tire frame member can be reduced.

DESCRIPTION OF EMBODIMENT

Figure 1:
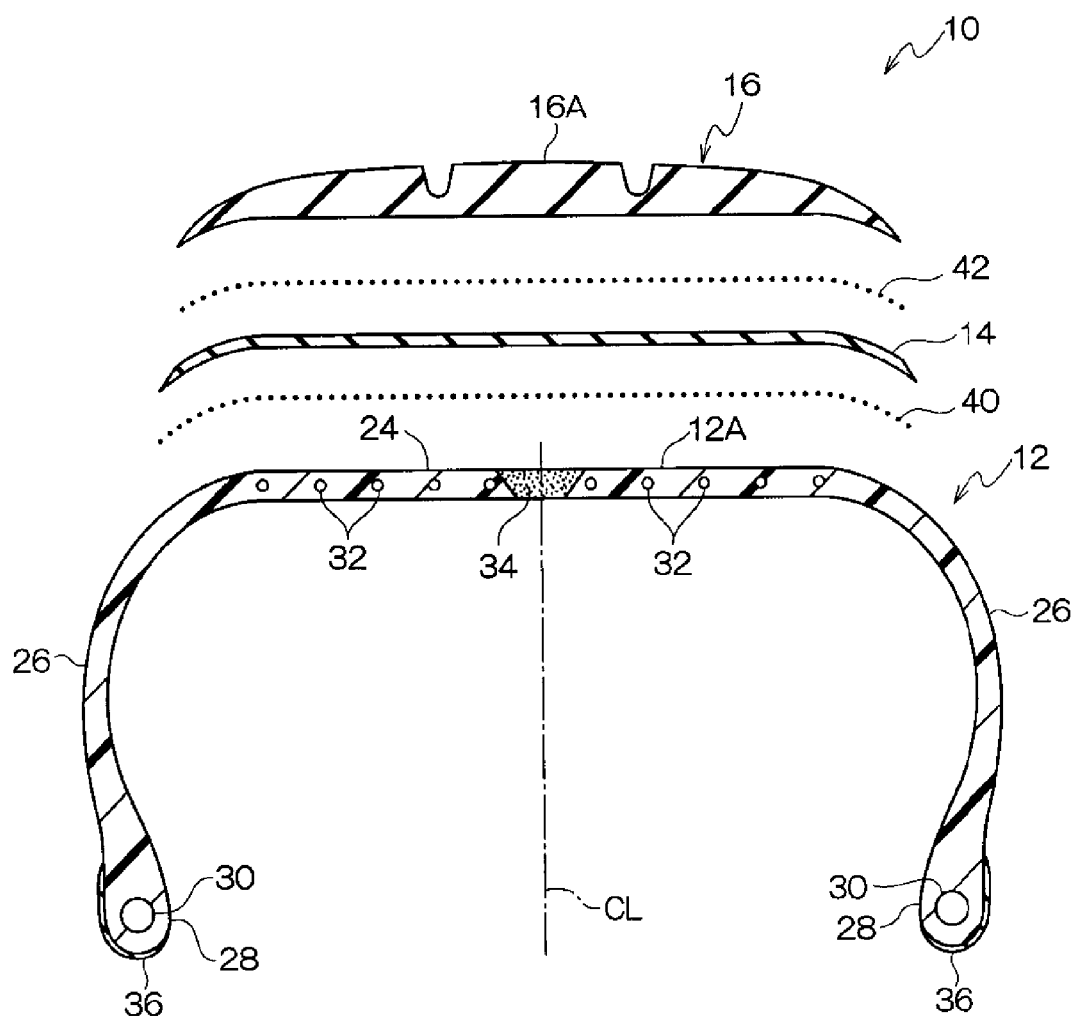
FIG. 1 is an exploded cross-sectional view showing a tire frame member, an adhesive, cushion rubber, a rubber cement composition, and tread rubber.
Figure 2:
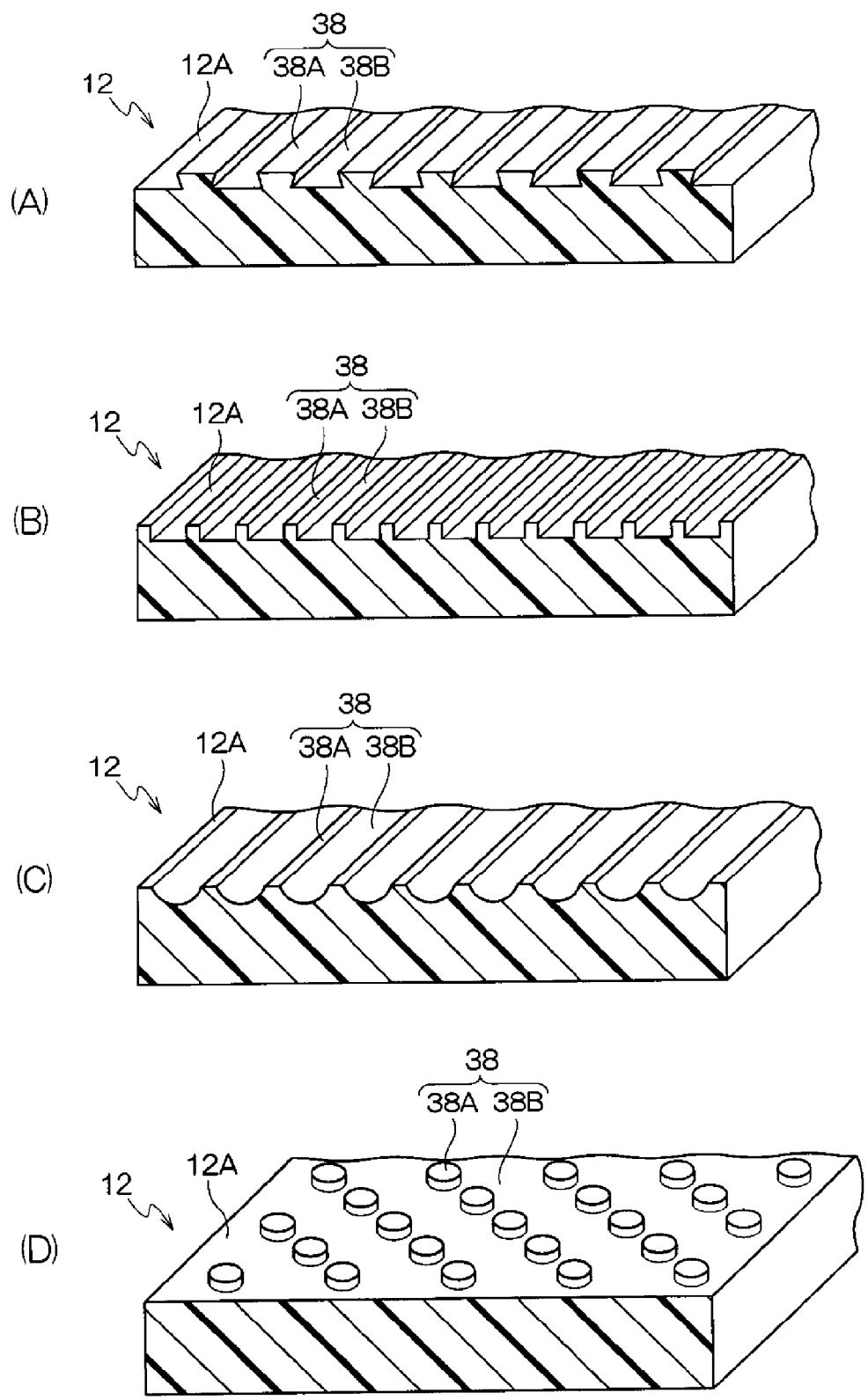
FIG. 2A is an enlarged perspective view showing, in a tire axial direction cross section, concavo-convex portions that are formed on an outer peripheral surface of the tire frame member and comprise inverted trapezoidal convex portions and trapezoidal concave portions.
FIG. 2B is an enlarged perspective view showing, in a tire axial direction section, concavo-convex portions that are formed on the outer peripheral surface of the tire frame member and comprise convex portions and concave portions whose width dimensions are constant.
FIG. 2C is an enlarged perspective view showing, in a tire axial direction cross section, concavo-convex portions that are formed on the outer peripheral surface of the tire frame member and comprise cross-sectionally arc-shaped concave portions and convex portions that are positioned between adjacent concave portions.
FIG. 2D is an enlarged perspective view showing, in a tire axial direction cross section, concavo-convex portions that are formed on the outer peripheral surface of the tire frame member and comprise convex portions that are arranged in a staggered manner and a concave portion that is a region outside the convex portions.

An embodiment of the present invention will be described below on the basis of the drawings. In FIG. 1 to FIG. 16, a tire manufacturing method pertaining to the present embodiment includes using a thermoplastic material to form a tire frame member 12, disposing cushion rubber 14 that is an example of unvulcanized rubber on an outer peripheral surface 12A of the tire frame member 12, further disposing vulcanized or semi-vulcanized tread rubber 16 on a tire diameter direction outer side of the cushion rubber 14, covering the tread rubber 16, the cushion rubber 14, and at least the tread rubber 16 side of the tire frame member 12 in an envelope 18, so as to push the tread rubber 16 against the tire frame member 12 side, to configure a provisionally assembled article 20, and accommodating the provisionally assembled article 20 inside a container 22 and performing heating and pressurization, for example, inside the container 20 to perform vulcanization to thereby adhere the tread rubber 16 to the tire frame member 12.

(Tire Frame Member)

The tire frame member 12 is molded using a thermoplastic material so as to have, for example, a shape corresponding to a crown portion 24 of a tire 10, a shape corresponding to side portions 26 that are continuous inwardly in the tire radiation direction from both tire axial direction sides of the crown portion 24, and a shape corresponding to bead portions 28 that are continuous with the tire radial direction inner sides of the side portions 26. Bead cores 30 are embedded in the bead portions 28. Metal, organic fiber, organic fiber covered in a resin, or a hard resin is used for the material of the bead cores 30. The bead cores 30 may also be omitted as long as the rigidity of the bead portions 28 is ensured and there are no problems in fitting the bead portions 28 to a rim (not illustrated).

As the thermoplastic material, a thermoplastic resin or a thermoplastic elastomer (TPE) that has elasticity like rubber can be used, but it is preferred that a thermoplastic elastomer be used considering elasticity during travel and formability during manufacture.

Examples of thermoplastic elastomers include polyamide thermoplastic elastomers (TPA), copolyester thermoplastic elastomers (TPC), olefinic thermoplastic elastomers (TPO), styrenic thermoplastic elastomers (TPS), urethane thermoplastic elastomers (TPU), and thermoplastic rubber vulcanizates (TPV) defined in JIS K6418, or other thermoplastic elastomers (TPZ).

Further, examples of thermoplastic resins include urethane resins, olefin resins, vinyl chloride resins, and polyamide resins.

Moreover, as these thermoplastic materials, for example, thermoplastic materials whose heat deflection temperature (under a load of 0.45 MPa) defined in ISO75-2 or ASTM D648 is equal to or greater than 78° C., whose tensile yield strength defined in JIS K7113 is equal to or greater than 10 MPa, whose tensile yield point elongation likewise defined in JIS K7113 is equal to or greater than 10%, whose tensile fracture elongation likewise defined in JIS K7113 is equal to or greater than 50%, and whose Vicat softening temperature (method A) defined in JIS K7206 is equal to or greater than 130° C. can be used.

The tire frame member 12 is first molded, for example, in half-shapes centering on the tire width direction center portion of the tire 10, that is, a tire equatorial plane CL, or a neighboring plane, and is configured by joining together the end portions of the crown portion 24. A joining member 34 such as the same type or a different type of thermoplastic material or an adhesive, for example, is used for the joining.

A cord 32 for reinforcement is, for example, helically wound in the crown portion 24. As the cord 32, for example, a steel cord, a monofilament of metal fiber or organic fiber, or a multifilament in which these fibers are twisted together may be used. In a case where a steel cord is used as the cord 32, a sheet (not illustrated) comprising a thermoplastic material can be stuck onto the tire diameter direction outer side of the crown portion 24, for example, and the cord 32 can be helically wound in the tire circumferential direction and embedded in the sheet while applying heat. At this time, both the cord 32 and the sheet may be heated.

In this way, by helically winding the cord 32 for reinforcement in the tire circumferential direction with respect to the crown portion 24, the rigidity of the crown portion 24 in the tire circumferential direction can be improved, and the fracture resistance of the crown portion 24 can be improved. Further, because of this, the puncture resistance in the crown portion 24 of the tire 10 can be raised. Helically winding the cord 32 in the tire circumferential direction when reinforcing the crown portion 24 is preferred because it is easy in terms of manufacturing, but the cord 32 may also be discontinuous in the tire width direction. Further, another reinforcing material (polymer material, metal fiber, cord, nonwoven fabric, woven fabric) may also be embedded and disposed in the tire frame member 12 (e.g., the bead portions 28, the side portions 26, the crown portion 24, etc.), so that the tire frame member 12 is reinforced by that reinforcing material.

Seal layers 36 are disposed on sites of the bead portions 28 of the tire frame member 12 that fit together with the rim (not illustrated). Because of this, the rim fittability of the bead portions 28 can be raised. As the seal layers 36, rubber, a resin, or an elastomer whose sealability is higher than that of the thermoplastic material used for the tire frame member 12 can be used. The seal layers 36 may also be omitted as long as sealability with the rim is ensured by only the thermoplastic material used for the tire frame member 12.

As shown in FIG. 2A to FIG. 2D, it is preferred that concavo-convex portions 38 be disposed beforehand, for example, on the outer peripheral surface 12A of the tire frame member 12 so that the cushion rubber 14 (FIG. 1) fits together with concavo-convex portions 38 after vulcanization. The concavo-convex portions 38 can be formed easily with a mold. The cushion rubber 14 flows because of heating, so it can be joined without any gap with respect to the concavo-convex portions 38.

The concavo-convex portions 38 shown in FIG. 2A are portions in which ridge-like convex portions 38A that extend along the tire circumferential direction and concave portions 38B are formed alternately in the tire width direction on the outer peripheral surface 12A of the tire frame member 12. In a tire axial direction cross section, the convex portions 38A are set in inverted trapezoidal shapes whose width dimension becomes larger from the tire center side outward in the tire radial direction. In accompaniment with this, the concave portions 38B are set in such a way that their width dimension becomes smaller from the tire center side outward in the tire radial direction. By disposing the concavo-convex portions 38, a so-called anchor effect, in which the cushion rubber 14 (FIG. 1) strongly fits together with the concavo-convex portions 38 after vulcanization, is obtained.

The concavo-convex portions 38 shown in FIG. 2B are portions in which ridge-like convex portions 38A that extend along the tire circumferential direction and concave portions 38B are formed alternately in the tire width direction on the outer peripheral surface 12A of the tire frame member 12; in a tire axial direction cross section, the width dimensions of the convex portions 38A and the concave portions 38B are constant in the tire radial direction.

The concavo-convex portions 38 shown in FIG. 2C are portions in which cross-sectionally arc-shaped concave portions 38B that extend along the tire circumferential direction are plurally formed at predetermined intervals in the tire width direction on the outer peripheral surface 12A of the tire frame member 12. In this example, the regions positions between the adjacent concave portions 38B are relatively convex portions 38A.

The concavo-convex portions 38 shown in FIG. 2D are portions in which plural cylinder-shaped or inverted truncated circular cone-shaped convex portions 38A are disposed upright, so as to project outward in the tire radial direction, on the outer peripheral surface 12A of the tire frame member 12 and where the convex portions 38A are arranged in a staggered manner, for example. In this example, the region outside the convex portions 38A is a relatively concave portion 38B.

(Placement of Cushion Rubber and Tread Rubber)

As shown in FIG. 1, when disposing the cushion rubber 14 on the outer peripheral surface 12A of the tire frame member 12, it is preferred that one layer or two layers, for example, of an adhesive 40 be applied to the outer peripheral surface 12A. It is preferred that the application of the adhesive 40 be performed in an atmosphere with a humidity equal to or less than 70%. The adhesive 40 is not limited to any particular type, but a triazine thiol adhesive, for example, can be used; in addition, a chlorinated rubber adhesive, a phenolic resin adhesive, an isocyanate adhesive, and a halogenated rubber adhesive can also be used.

Further, before applying the adhesive 40 to the outer peripheral surface 12A, it is preferred that the outer peripheral surface 12A be buffed with sandpaper or a grinder. This is because doing so allows the adhesive 40 to stick more easily to the outer peripheral surface 12A. Moreover, it is preferred that the outer peripheral surface 12A after buffing be cleaned and degreased with alcohol or the like. Further, it is preferred that a corona treatment or an infrared treatment be performed with respect to the outer peripheral surface 12A after buffing.

When disposing the vulcanized or semi-vulcanized tread rubber 16 on the tire diameter direction outer side of the cushion rubber 14, it is preferred that a rubber cement composition 42, for example, that has stickiness be applied to the undersurface side of the tread rubber 16 or the outer peripheral surface side of the cushion rubber 14. This is because the tread rubber 16 becomes provisionally held by sticking it to the cushion rubber 14, and workability improves.

In a case where SBR (styrene-butadiene rubber) is used as the material of the tread rubber 16, it is preferred that an SBR splice cement, for example, be used as the rubber cement composition 42. Further, in a case where an SBR rubber in which the compounding ratio of NR (natural rubber) is high is used as the material of the tread rubber 16, it is preferred that an SBR splice cement in which BR (butadiene rubber) has been compounded be used. In addition, it is also possible to use, as the rubber cement composition 42, a solventless cement in which a liquid elastomer such as liquid BR has been compounded or a cement whose main component is an IR (isoprene rubber)-SBR blend.

The tread rubber 16 is a PCT (Pre-Cured Tread) where a tread pattern such as main grooves are formed beforehand on a tread 16A side. In order to form the tread pattern, unvulcanized rubber is vulcanized inside a mold for PCT to mold the tread rubber 16. At this time, the tread rubber 16 is placed in a vulcanized state where the vulcanization degree required of the end product has been reached or a semi-vulcanized state where the degree of vulcanization is higher than that in an unvulcanized state but the degree of vulcanization required of the end product has not been reached.

Figure 3:
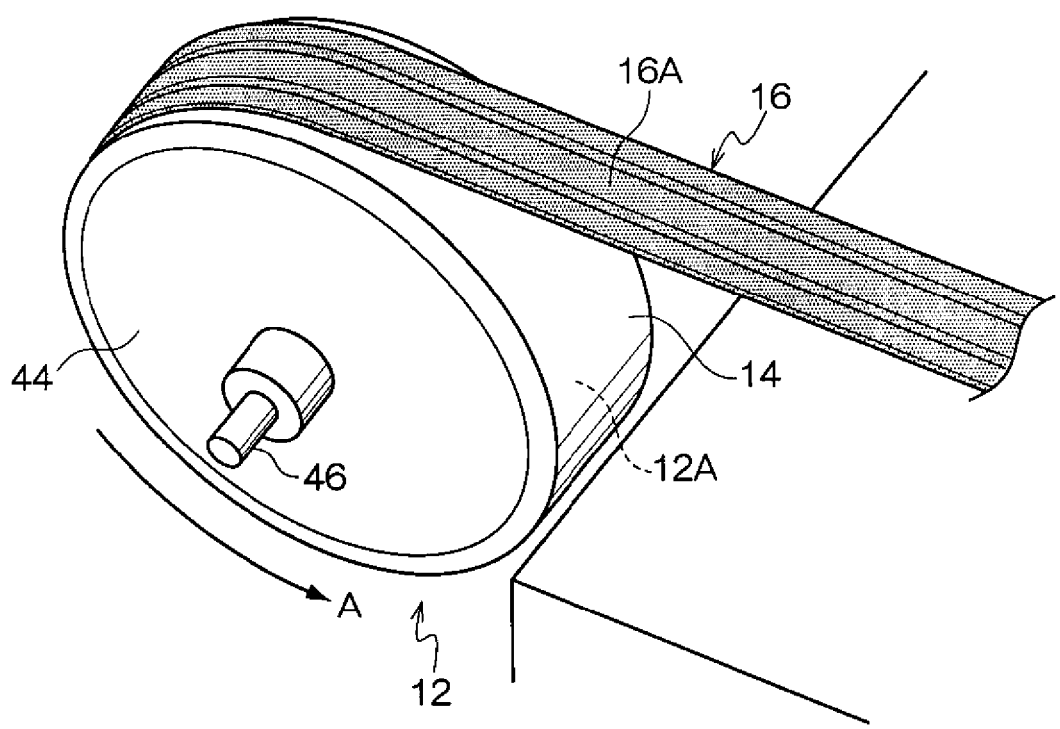
FIG. 3 is a perspective view showing a step of winding belt-like tread rubber onto the outer periphery of the cushion rubber disposed on the outer peripheral surface of the tire frame member.
Figure 4:
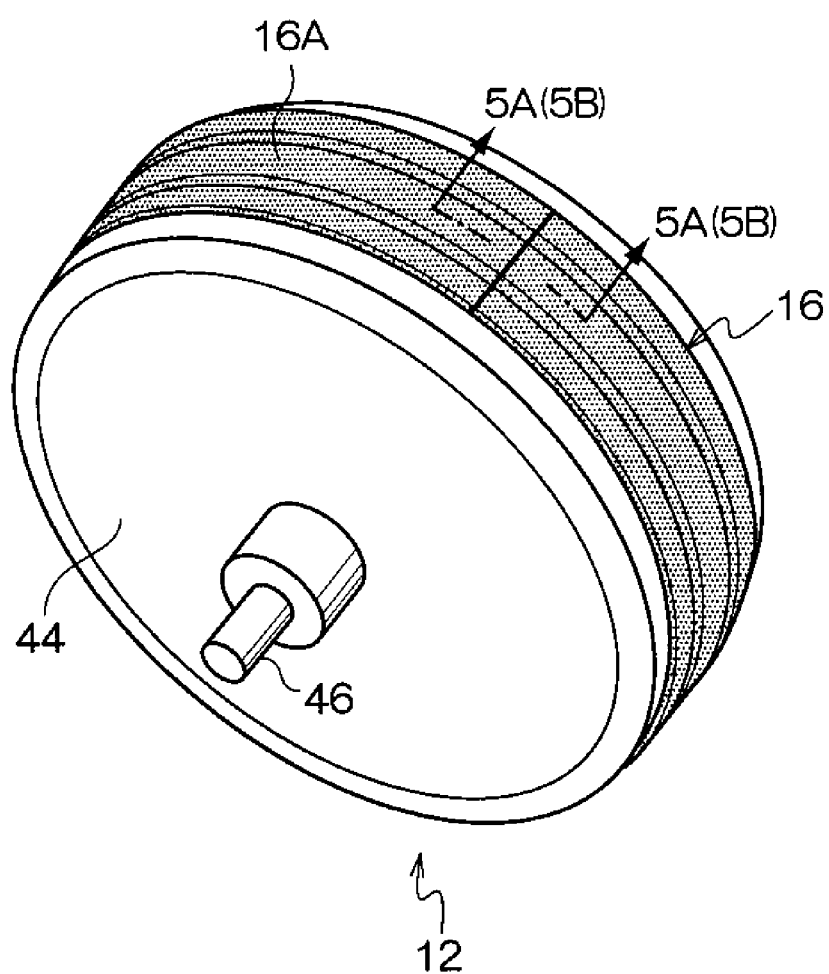
FIG. 4 is a perspective view showing a state where end portions of the belt-like tread rubber wound onto the outer periphery of the cushion rubber in FIG. 3 have been put together to form an annular shape.
Figure 5:
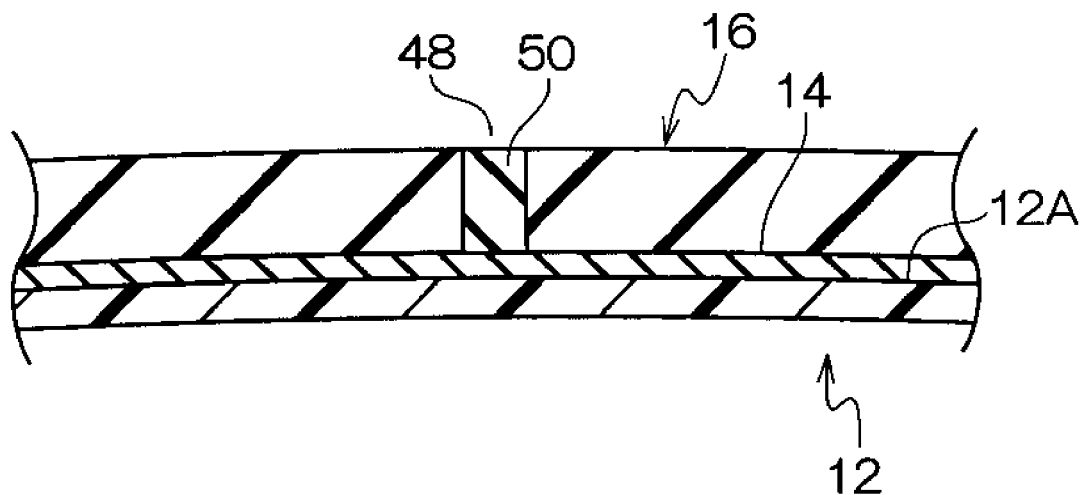
FIG. 5A is an enlarged cross-sectional view taken along arrows 5A-5A in FIG. 4 and shows an example where, at a joint in the tread rubber, the end portions that are along the tire radial direction face each other in the tire circumferential direction.
FIG. 5B is an enlarged cross-sectional view taken along arrows 5B-5B in FIG. 4 and shows an example where, at the joint in the tread rubber, the end portions that slant with respect to the tire radial direction face each other in a substantially parallel manner.
Figure 5:
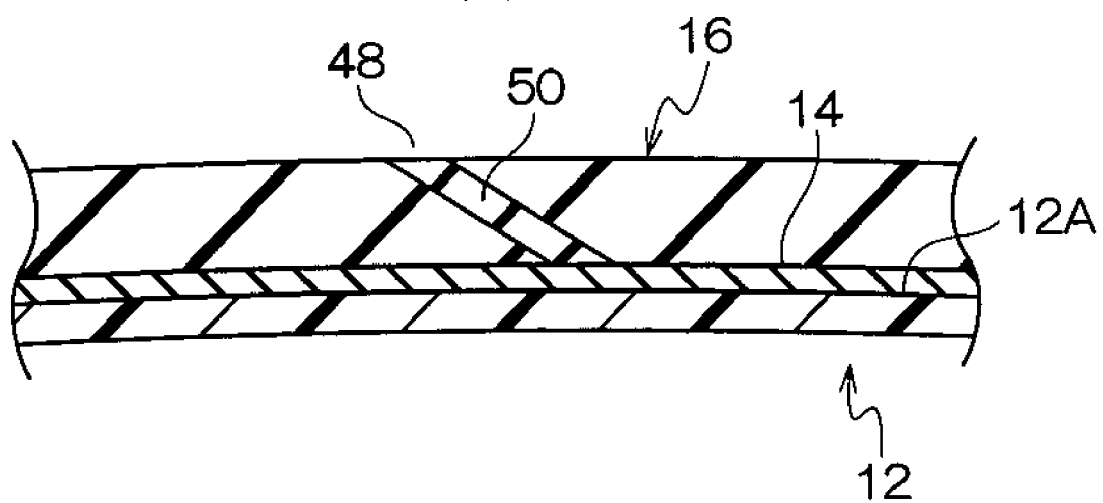
Figure 6:
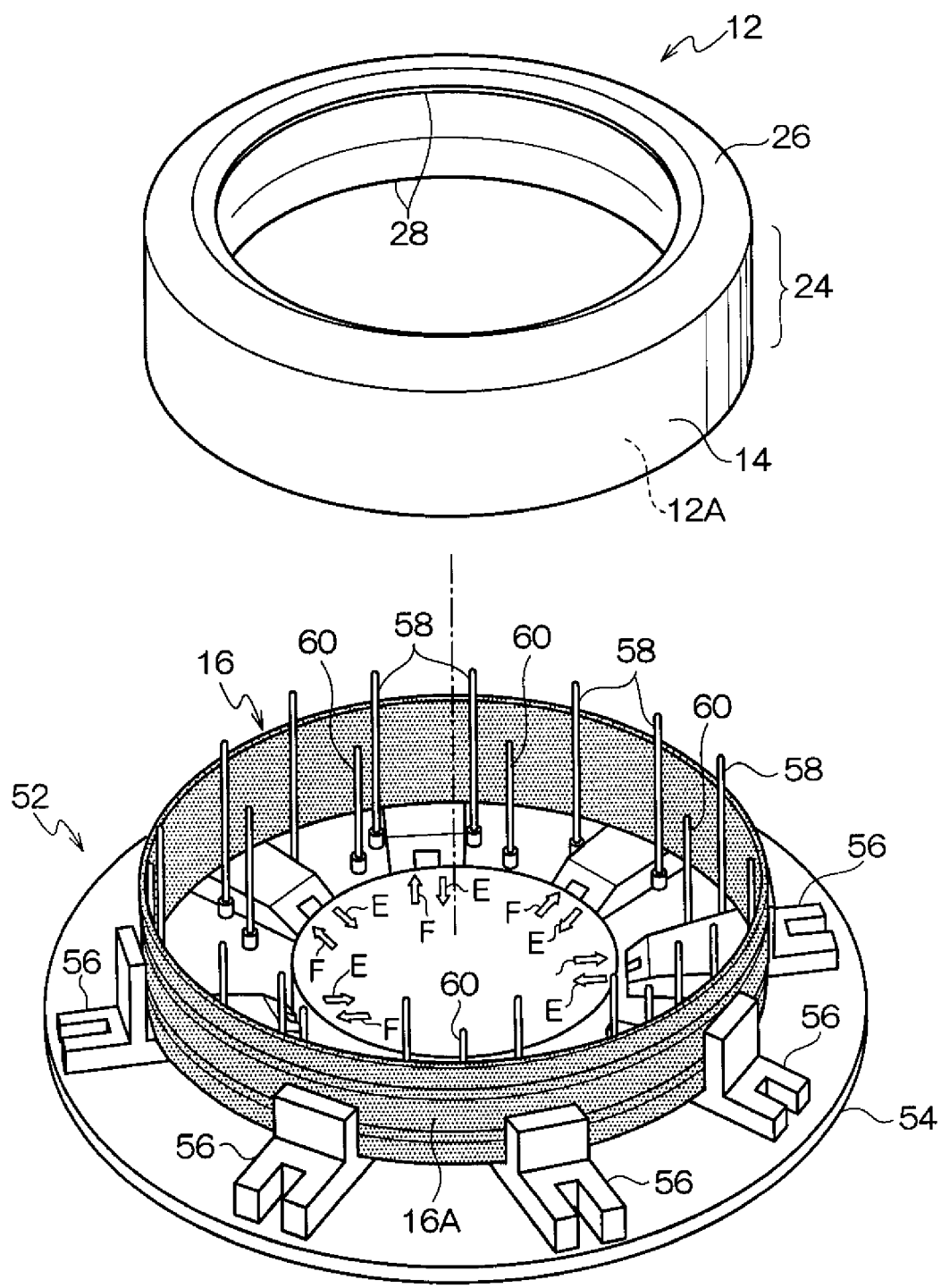
FIG. 6 is a perspective view showing a state where the diameter of the annular tread rubber is being expanded by a jig.
Figure 7:
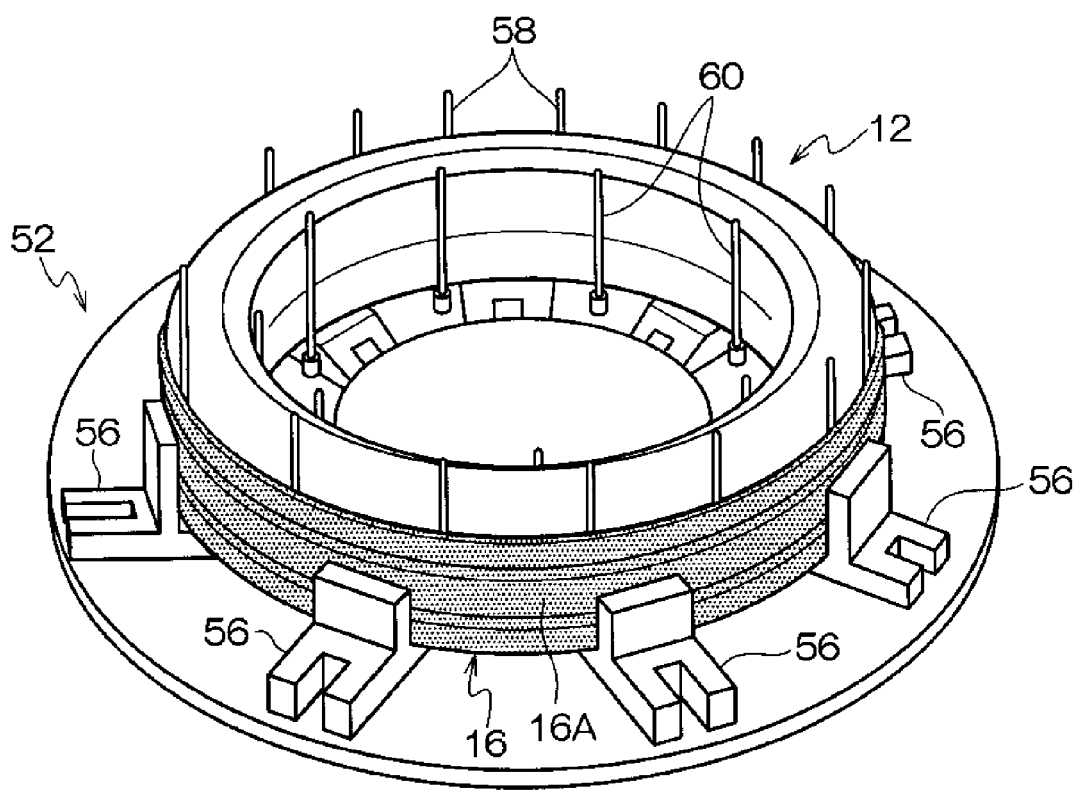
FIG. 7 is a perspective view showing state where the tire frame member has been disposed on an inner peripheral side of the tread rubber whose diameter has been expanded.
Figure 8:
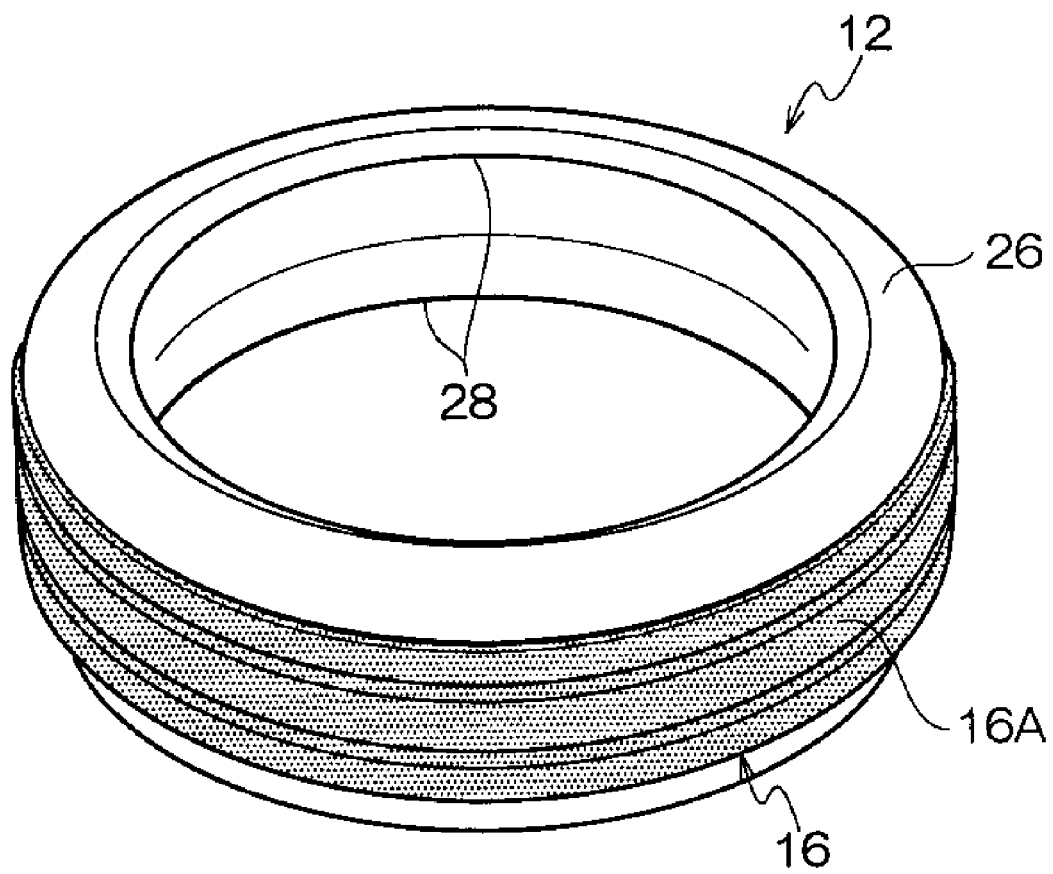
FIG. 8 is a perspective view showing a state where the tread rubber has been disposed on a tire diameter direction outer side of the cushion rubber.

When disposing the tread rubber 16 on the outer periphery of the cushion rubber 14, as shown in FIG. 3 to FIG. 5, belt-like tread rubber 16 may be annularly wound onto the outer periphery of the cushion rubber 14, or, as shown in FIG. 6 to FIG. 8, tread rubber 16 that has been formed in an annular shape beforehand may be used.

Here, the method of annularly winding the belt-like tread rubber 16 onto the diameter direction outer side of the cushion rubber 14 in FIG. 3 to FIG. 5 will be briefly described. In this method, as shown in FIG. 3, the tire frame member 12, on whose outer peripheral surface 12A the cushion rubber 14 has been disposed, is supported by a disc-shaped support member 44, for example, the tire frame member 12 is rotated in the direction of arrow A about a support shaft 46 disposed in the center of the support member 44, and one circumference's worth of the tread rubber 16, which is supplied from a direction orthogonal to the tire axial direction, is wound onto the outer periphery of the tread rubber 14 (see FIG. 1) disposed on the outer peripheral surface 12A of the tire frame member 12 and is cut. Then, as shown in FIG. 4, the end portions are put together to form an annular shape. In FIG. 5A and FIG. 5B, unvulcanized rubber 50, for example, is disposed in a joint 48 between the end portions, and the end portions are vulcanized and adhered in a later-described vulcanizing step. The cross-sectional shape of the joint 48 may be a simple joint where the end surfaces that are along the tire radial direction face each other in the tire circumferential direction such as shown in FIG. 5A or may be a joint where the end surfaces that slant with respect to the tire radial direction face each other in a substantially parallel manner as shown in FIG. 5B.

Next, the method of disposing the annular tread rubber 16 on the tire diameter direction outer side of the cushion rubber 14 in FIG. 6 to FIG. 8 will be briefly described. In this method, as shown in FIG. 6, the diameter of the annular tread rubber 16 is expanded by a jig 52, and the tire frame member 12 is disposed on the inner peripheral side of the tread rubber 16 whose diameter has been expanded. Although it is not illustrated, the cushion rubber 14 (see FIG. 1) is disposed on the outer peripheral surface 12A of the tire frame member 12.

The jig 52 is equipped with plural (in the present embodiment, a total of eight) moving blocks 56 disposed in a circle on a disc-shaped base 54. These moving blocks 56 are configured to be synchronously movable inward in the diameter direction (the direction of arrows E) and outward in the diameter direction (the direction of arrows F) of the base 54 by feeding means such as cylinders or screws. Further, plural (in the present embodiment, a total of two) pins 58 are disposed upright on each of the moving blocks 56. Plural pins 60 are disposed along a circle on the inner peripheral side of the pins 58 on the base 54.

All of the pins 58 are disposed in positions along a circle and are moved inward in the diameter direction (the direction of arrows E) and outward in the diameter direction (the direction of arrows F) of the base 54 by the movement of the moving blocks 56.

Consequently, by disposing the annular tread rubber 16 on the outer peripheral side of the pins 58 and moving the moving blocks 56 outward in the diameter direction (the direction of arrows F) of the base 54, the diameter of the tread rubber 16 is expanded. Thereafter, as shown in FIG. 7, the tire frame member 12 is disposed on the inner peripheral side of the tread rubber 16. At this time, the tire frame member 12 becomes disposed between the pins 58 and the pins 60.

Thereafter, all of the pins 58 and 60 are removed from between the tread rubber 16 and the tire frame member 12, whereby, as shown in FIG. 8, the tread rubber 16 becomes disposed on the tire diameter direction outer side of the cushion rubber 14 (not illustrated). At this time, the cushion rubber 14 becomes sandwiched between the outer peripheral surface 12A of the tire frame member 12 and the tread rubber 16 due to the tension of the annular tread rubber 16 whose diameter was expanded.

Figure 9:
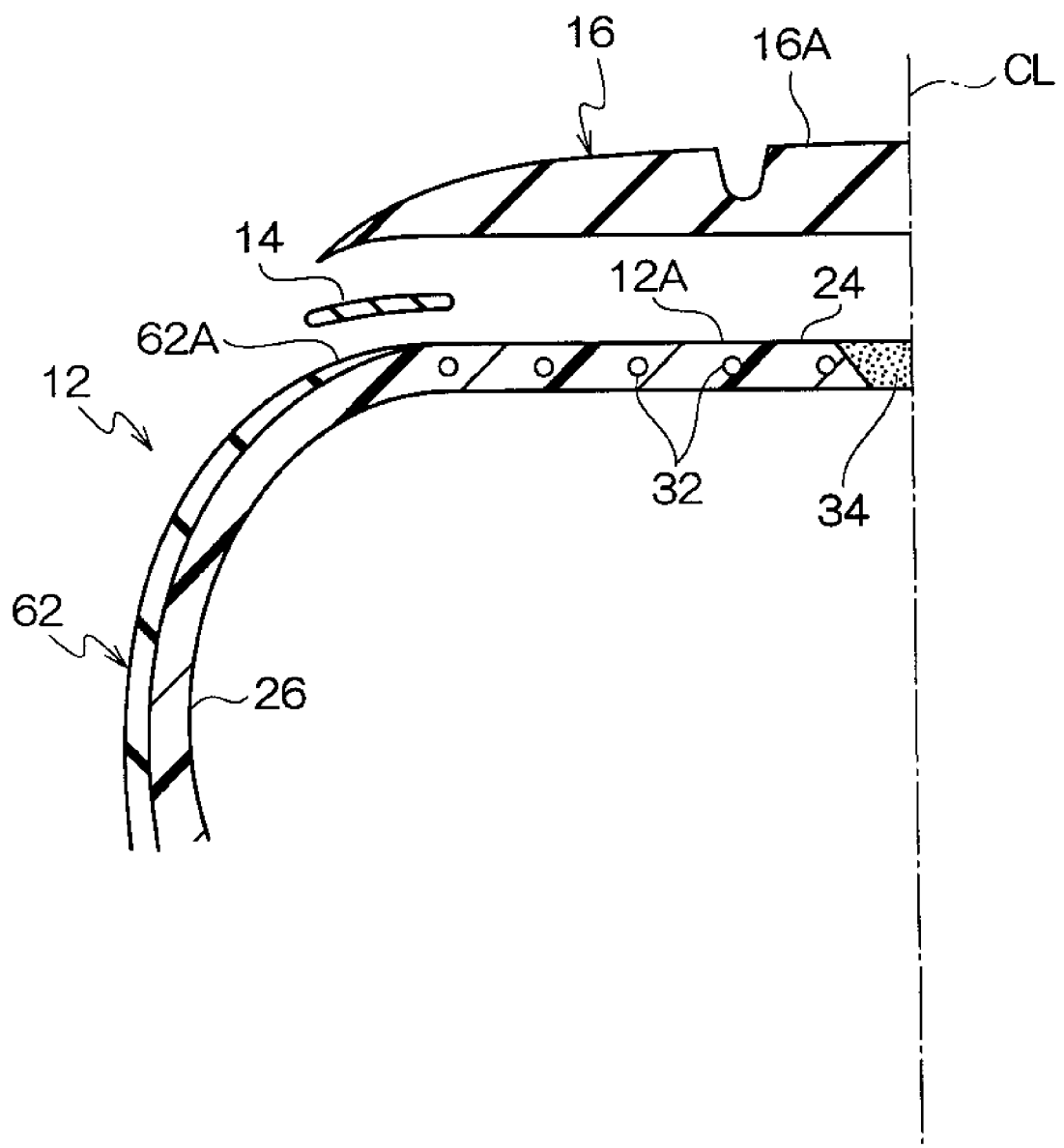
FIG. 9 is a cross-sectional view showing an example where a vulcanized rubber layer is disposed in at least part of a region of the outer peripheral surface of the tire frame member within which the tread rubber is adhered and the cushion rubber is disposed at least between the tread rubber and the rubber layer.

As shown in FIG. 9, a vulcanized rubber layer 62A may be disposed in at least part of a region of the outer peripheral surface 12A of the tire frame member 12 within which the tread rubber 16 is adhered, and the cushion rubber 14 may be disposed at least between the tread rubber 16 and the rubber layer 62A. The rubber layer 62A is a tread-side end portion of side rubber 62 disposed on the side portion 26 of the tire frame member 12, for example, and is formed by extending the side rubber 62 as far as the outer peripheral surface 12A of the tire frame member 12. The side rubber 62 is fixed by adhesion, for example, with respect to the tire frame member 12.

In a case where the tire frame member 12 is a tube body, the belt-like tread rubber 16 may be helically wound continuously in the tire circumferential direction in a state where internal pressure is applied to the tube body. Further, in the case of the beaded tire frame member 12, the tire frame member 12 may be assembled to a rim, and the tread rubber 16 may be disposed in a state where internal pressure is applied through a valve (not illustrated) disposed on the rim.

(Assembly and Vulcanization of Provisionally Assembled Article)

Next, as shown in FIG. 10 to FIG. 13, the tread rubber 16, the cushion rubber 14, and at least the tread rubber 16 side of the tire frame member 12 are covered with an envelope 18 to configure a provisionally assembled article 20. The envelope 18 is a covering member made of rubber, for example, that has air tightness and extensibility, is thermally and chemically moderately stable, and has moderate strength. A suction opening 64 for pushing the tread rubber 16 against the tire frame member 12 side by vacuuming the inside of the region covered in the envelope 18 is disposed in the envelope 18. It is preferred that the suction opening 64 have a valve mechanism (not illustrated) for preventing the inflow of air into the inside of the envelope 18 from the outside after the vacuuming.

Figure 10:
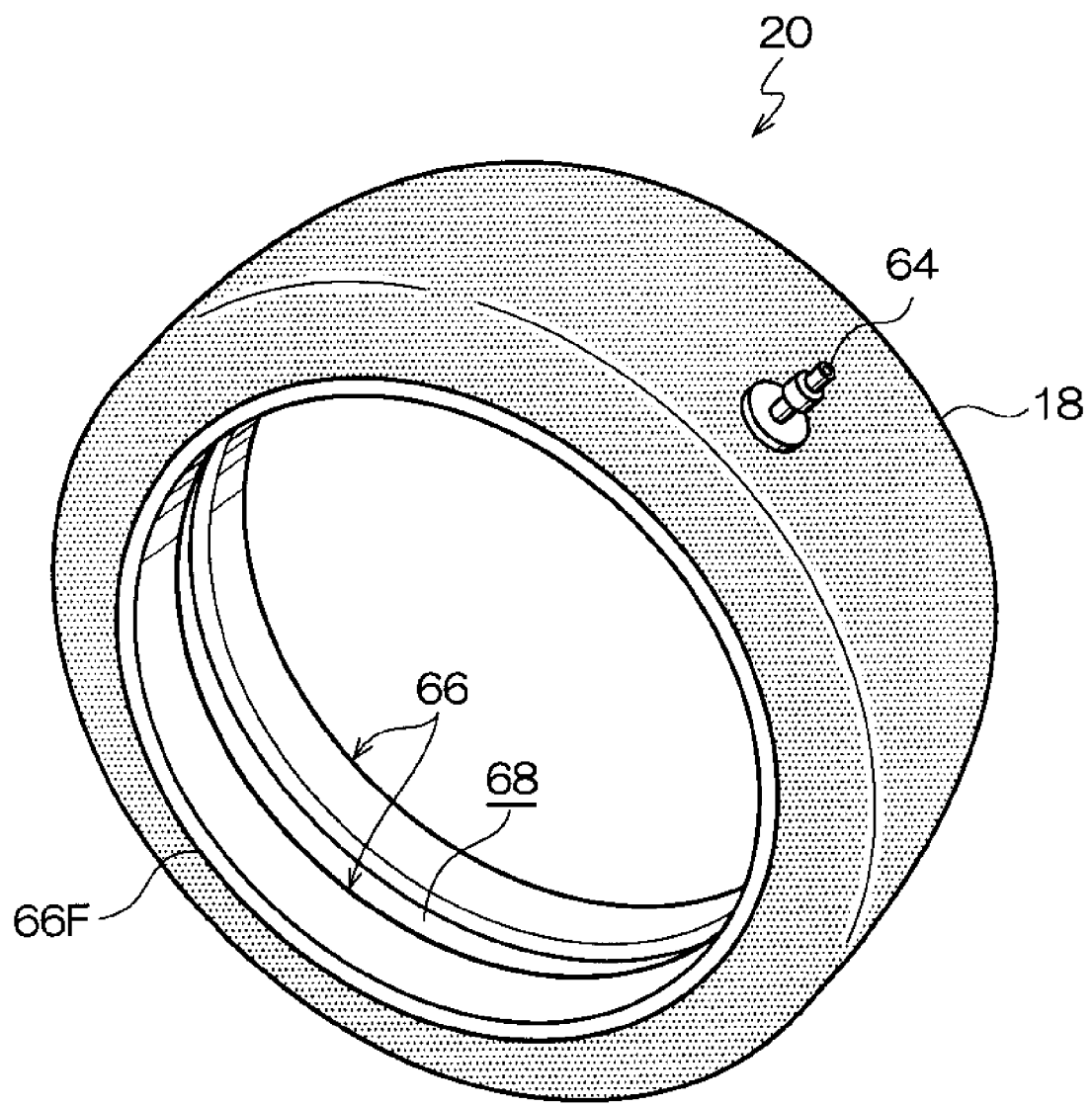
FIG. 10 is a perspective view showing a provisionally assembled article in which the cushion rubber and at least the tread rubber side of the tire frame member are covered with an envelope.
Figure 11:
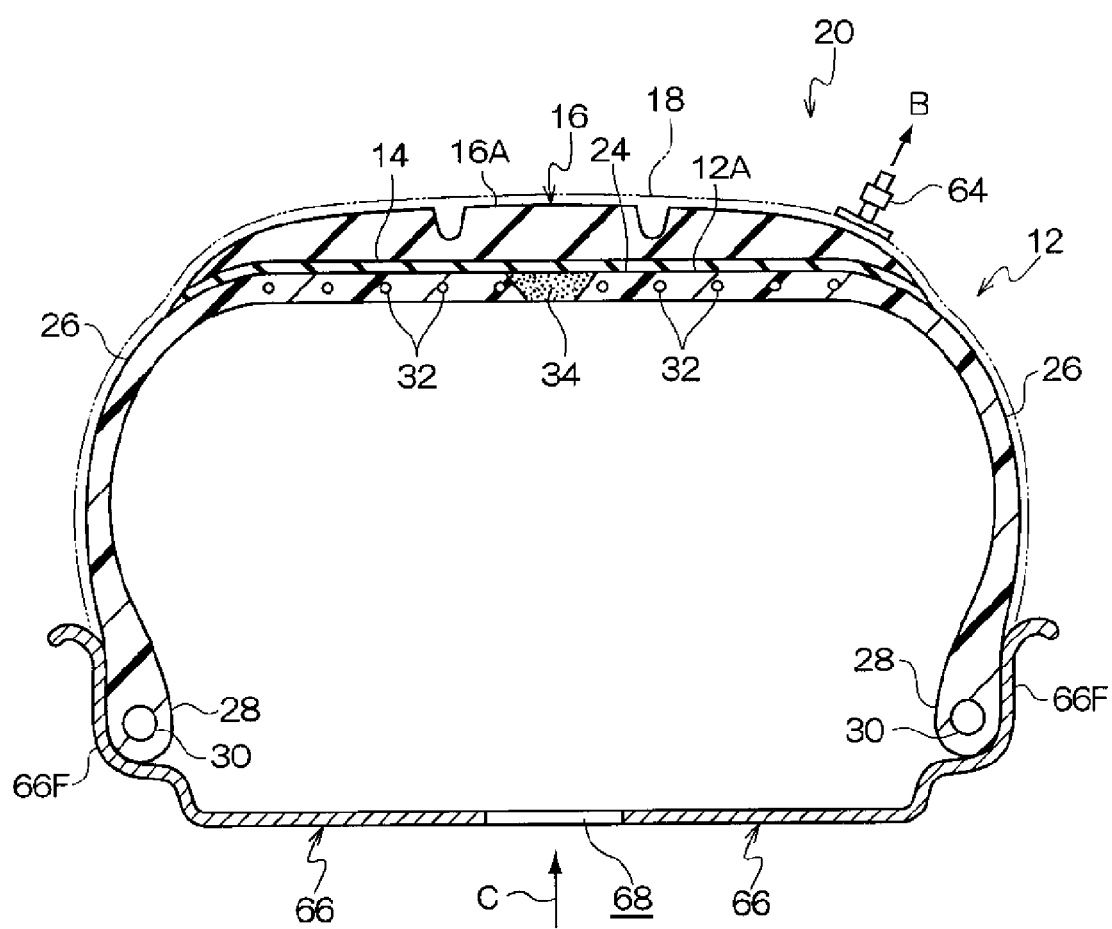
FIG. 11 is a cross-sectional view showing an example of the provisionally assembled article.

In the example shown in FIG. 10 and FIG. 11, the tire frame member 12 is assembled onto a pair of annular support members 66 having a structure close to that of a rim, and the bead portions 28 are firmly attached to flange portions 66F of the support members 66. The envelope 18 covers the outer surfaces of the side portions 26 on both sides of the tire frame member 12 and the tread rubber 16, and its end edges (not illustrated) on the tire diameter direction inner side are sandwiched between the bead portions 28 and the flange portions 66F.

By performing vacuuming through the suction opening 64 in this state, the envelope 18 can be firmly attached to the tread rubber 16 and the tire frame member 12, and the tread rubber 16 can be pushed against the tire frame member 12 side. A predetermined interstice 68 is disposed between the pair of support members 66. By causing pressure during vulcanization to act on the inner surface side of the tire frame member 12 through the interstice 68 (the direction of arrow C), the shape of the tire frame member 12 can be held.

Figure 12:
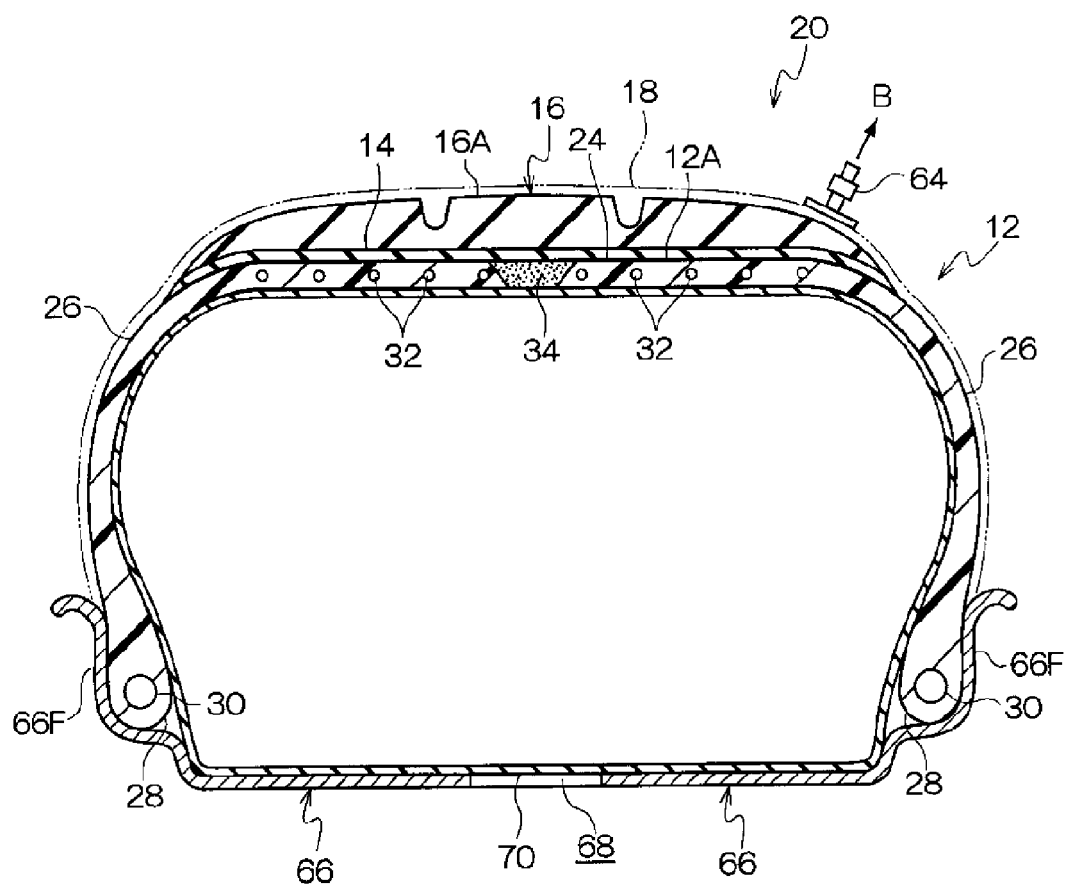
FIG. 12 is a cross-sectional view showing another example of the provisionally assembled article.

Further, as shown in FIG. 12, a bladder 70 may be disposed on the inner surface side of the tire frame member 12. The configuration of the envelope 18 is the same as in FIG. 11. In this example, by inflating the bladder 70 during vulcanization, pressure can be caused to act on the inner surface side of the tire frame member 12 so that the shape of the tire frame member 12 can be held.

Figure 13:
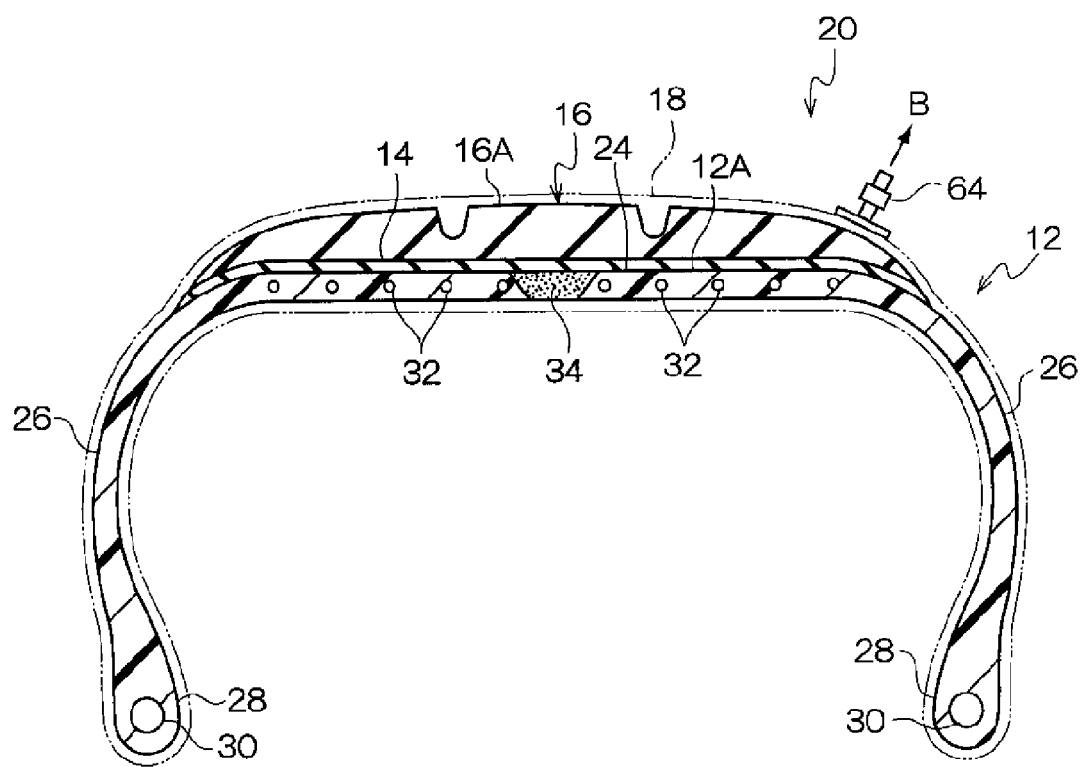
FIG. 13 is a cross-sectional view showing another example of the provisionally assembled article.

Moreover, as shown in FIG. 13, in a case where the tire frame member 12 has a sufficient rigidity to the extent that the tire frame member 12 will not deform during vacuuming of the inside of the envelope 18, the tread rubber 16 and not just the outer surface side but also the inner surface side of the tire frame member 12 may be covered by the envelope 18 without using the support members 66.

The crown portion 24 of the tire frame member 12 may be supported from the inner surface side, so that the shape of the crown portion 24 is held, by using a jig (not illustrated) in which inner pieces that are movable in the tire radial direction are plurally disposed in the tire circumferential direction and moving the inner pieces outward in the tire radial direction. It is preferred that disassembly and assembly of the jig be easy.

Figure 14:
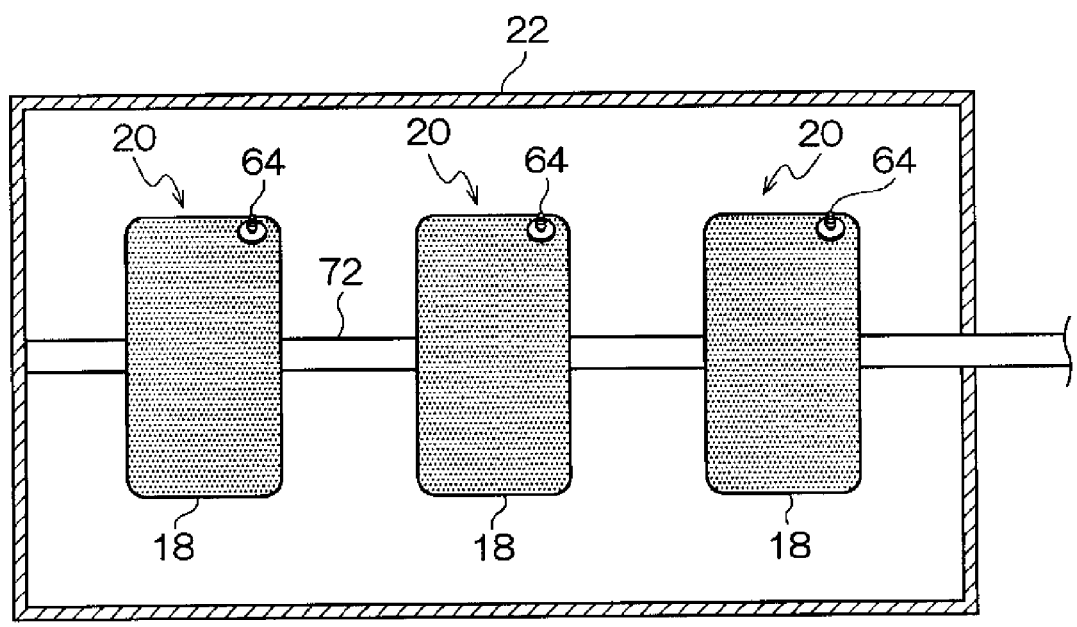
FIG. 14 is a cross-sectional view schematically showing an example where the provisionally assembled article is supported by a support member inside a container for vulcanization.
Figure 15:
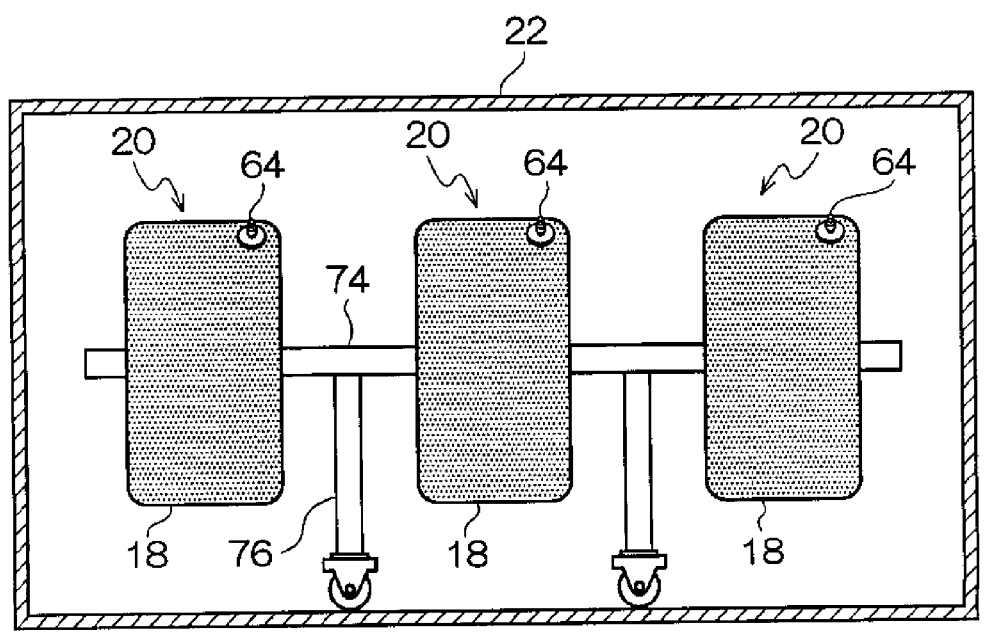
FIG. 15 is a cross-sectional view schematically showing an example where the provisionally assembled article that is supported by a support member on a cart has been placed inside the container for vulcanization together with the cart.

Additionally, as shown in FIG. 14 and FIG. 15, the provisionally assembled article 20 is put inside a container 22, and heating and pressurization inside the container 22 are performed to perform vulcanization. The container 22 is a so-called vulcanizer, but any form may be used as long as it is a container that has a capacity accommodating the provisionally assembled article 20 and can withstand heating and pressurization during vulcanization. As for the vulcanization conditions, for example, the temperature is 120° C., the pressure is 2026 hPa (2 atm.), and the time is 1 hour.

From the standpoint of preventing deformation of the tread rubber 16 and so forth, it is preferred that the outer peripheral portion of the provisionally assembled article 20 does not touch the inner wall of the container 22 and so forth when accommodating the provisionally assembled article 20 inside the container 22. As means for this purpose, for example a method where one or several of the provisionally assembled articles 20 are supported by a support member 72 as shown in FIG. 14 and a method where one or several of the provisionally assembled articles 20 are supported by a support member 74 disposed on a cart 76 and the provisionally assembled articles 20 are placed inside the container 22 together with the cart 76 are conceivable.

Here, as a vulcanization accelerator, sulfur or peroxide can be used. Further, carbon black or silica can be used for a reinforcing agent of the cushion rubber 14, and silica is more preferred. Moreover, aminosilane or polysulfide can be used for a coupling agent.

It is preferred that the vulcanization temperature be equal to or greater than 100° C. and less than 160° C. This is because if the vulcanization temperature is equal to or greater than 160° C., there is the potential for the crown portion 24 reinforced by the cord 32 (see FIG. 11 to FIG. 13) to end up buckling due to thermal contraction of the thermoplastic material used for the tire frame member 12. And if the vulcanization temperature is less than 100° C., there are cases where the vulcanization degree of the cushion rubber 14 becomes insufficient.

Figure 16:
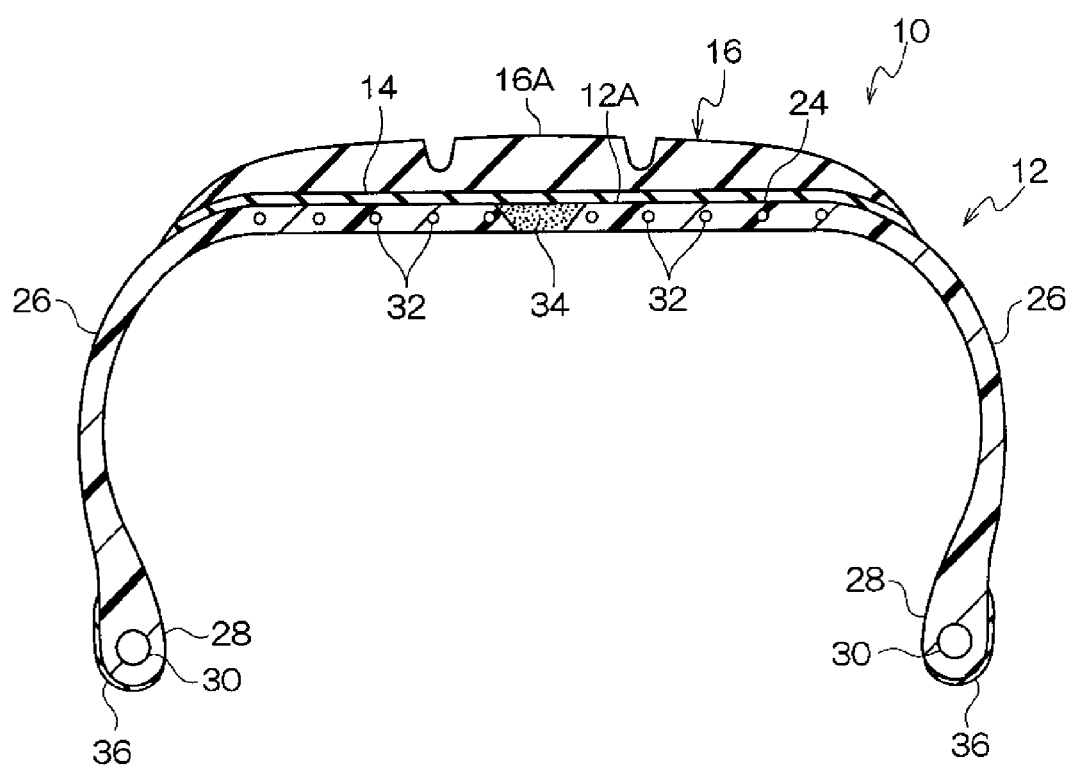
FIG. 16 is a cross-sectional view showing a tire within which the tread rubber has been adhered to the tire frame member that uses a thermoplastic material.

By setting the temperature inside the container 22 in this way and also setting the pressure inside the container 22 to a pressure suited for vulcanization and performing vulcanization for a predetermined amount of time, the cushion rubber 14 is vulcanized. Because of this, as shown in FIG. 16, the tread rubber 16 and the outer peripheral surface 12A of the tire frame member 12 are vulcanized and adhered to form the tire 10 (a pneumatic tire). In a case where semi-vulcanized tread rubber 16 is used, the tread rubber 16 is further vulcanized to reach the vulcanization degree of the end product. As shown in FIG. 5A and FIG. 5B, in a case where the belt-like tread rubber 16 is used and the unvulcanized rubber 50 is disposed in the joint 48 thereof, the unvulcanized rubber 50 is vulcanized and the joint 48 of the tread rubber 16 is also vulcanized and adhered.

In this way, in the present embodiment, the tread rubber 16 can be adhered to the tire frame member 12 that uses the thermoplastic material, and the tire 10 can be manufactured, without using a vulcanizing mold in which a large-scale vulcanizing machine becomes necessary. For this reason, the manufacturing cost of the tire 10 that uses the thermoplastic material for the tire frame member 12 can be reduced.

Pressurization inside the container 22 is not invariably essential. It is possible to perform vulcanization just by heating. However, by performing pressurization inside the container 22, the adhesion of the tread rubber 16 with respect to the tire frame member 12 can be raised.

Further, as shown in FIG. 9, in the case of disposing the cushion rubber 14 between the tread rubber 16 and the vulcanized rubber layer 62A disposed on the outer peripheral surface 12A of the tire frame member 12 and performing vulcanization, the vulcanized rubber or the semi-vulcanized rubber (the tread rubber 16) and the vulcanized rubber (the rubber layer 62A) can be vulcanized and adhered, so the tread rubber 16 can be easily adhered to the tire frame member 12 that uses the thermoplastic material. In a case where the vulcanized rubber layer 62A is part of the side rubber 62, the number of man-hours can be cut and the manufacturing cost of the tire 10 can be further reduced compared to a case where the side rubber 62 is separately disposed.

The cushion rubber 14 may be disposed not only between the vulcanized rubber layer 62A and the tread rubber 16 but also between the tread rubber 16 and the region of the outer peripheral surface 12A of the tire frame member 12 where the rubber layer 62A is not disposed.

As shown in FIG. 2A to FIG. 2D, in a case where the concavo-convex portions 38 are disposed on the outer peripheral surface 12A of the tire frame member 12, the concavo-convex portions 38 fit together with the cushion rubber 14 after vulcanization, and mechanical bonding between the tread rubber 16 and the tire frame member 12 is ensured, so the joint strength of the tire 10 between the tread rubber 16 and the tire frame member 12 becomes higher.

The configuration of covering the tread rubber 16, the cushion rubber 14, and at least the tread rubber 16 side of the tire frame member 12 in the envelope 18 is not limited to the present embodiment and the illustrated configurations. Further, the order of the steps in the tire manufacturing method pertaining to the present embodiment can be appropriately changed.

Figure 17:
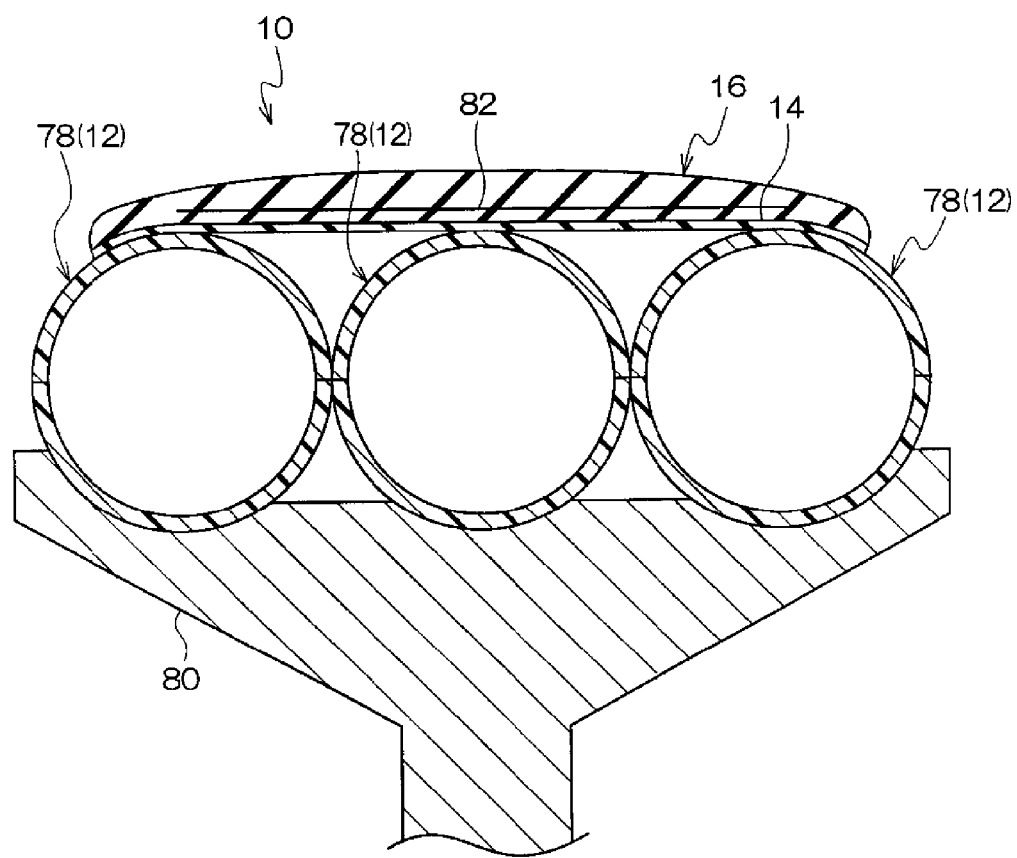
FIG. 17 is a cross-sectional view showing a tire that uses three rows of tube bodies as the tire frame member.

Moreover, the tire 10 pertaining to the above-described embodiment is a tubeless type of tire that uses the tire frame member 12 having the bead cores 30, but the configuration of the tire 10 is not limited to this. As shown in FIG. 17, as the tire frame member 12 that uses the thermoplastic material, a hollow tube body 78 that is formed in an annular shape in the tire circumferential direction and is disposed on the outer peripheral portion of a rim 80 may also be used. The tube body 78 can be disposed in plural rows (FIG. 17) or a single row (FIG. 19) in the tire width direction.

In the example shown in FIG. 17, as the tire frame member 12, three tube bodies 78 are disposed on the outer peripheral portion of the rim 80. The tread rubber 16 in which a belt layer 82 for reinforcement has been embedded, for example, is disposed straddling, and is vulcanized and adhered to, the outer peripheral portions of the tube bodies 78 via the cushion rubber 14, for example.

Figure 18:
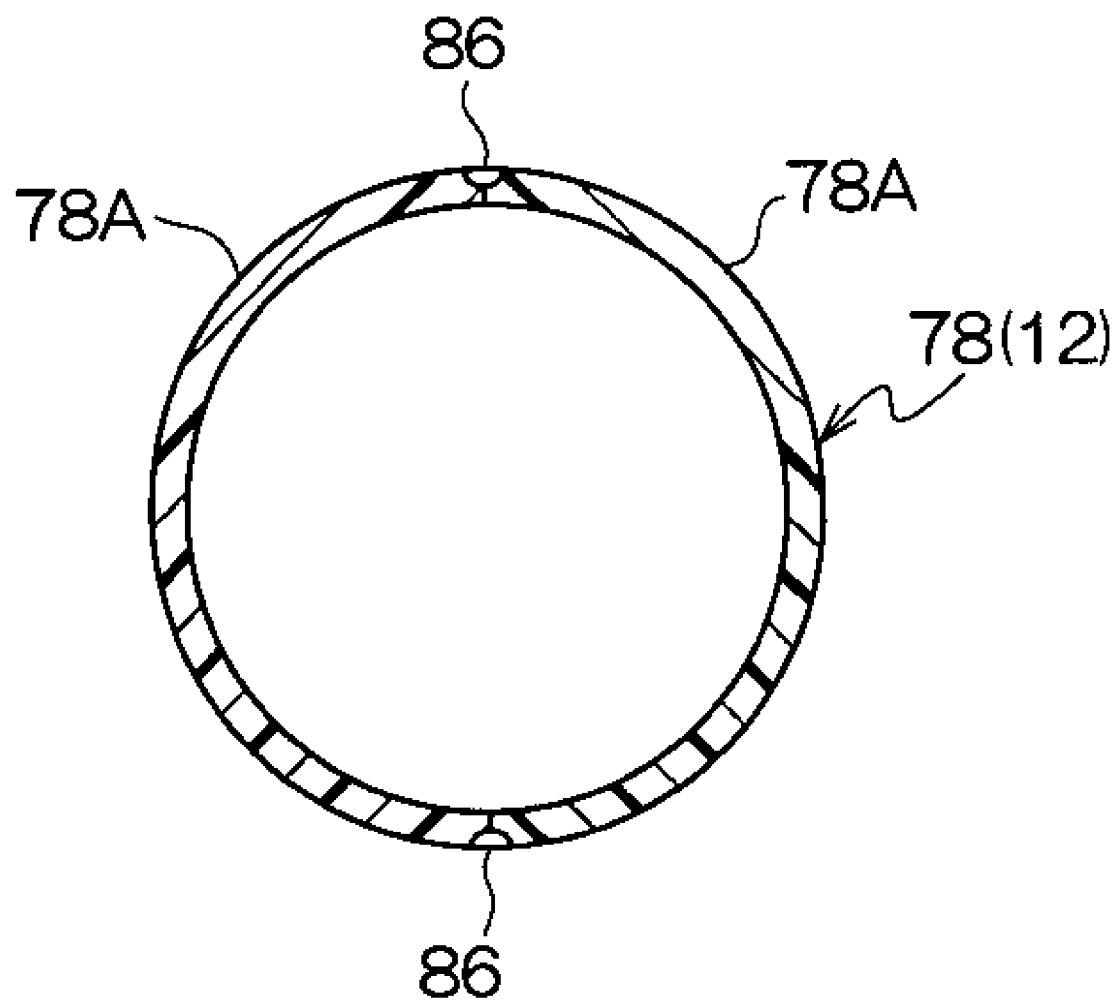
FIG. 18 is a cross-sectional view showing the tube body.

As shown in FIG. 18, the tube body 78 can be formed by putting cross-sectionally semicircular tube half-bodies 78A face-to-face with each other and welding them together with a thermoplastic material 86 for welding or joining them together with unillustrated fusing sheets.

Figure 19:
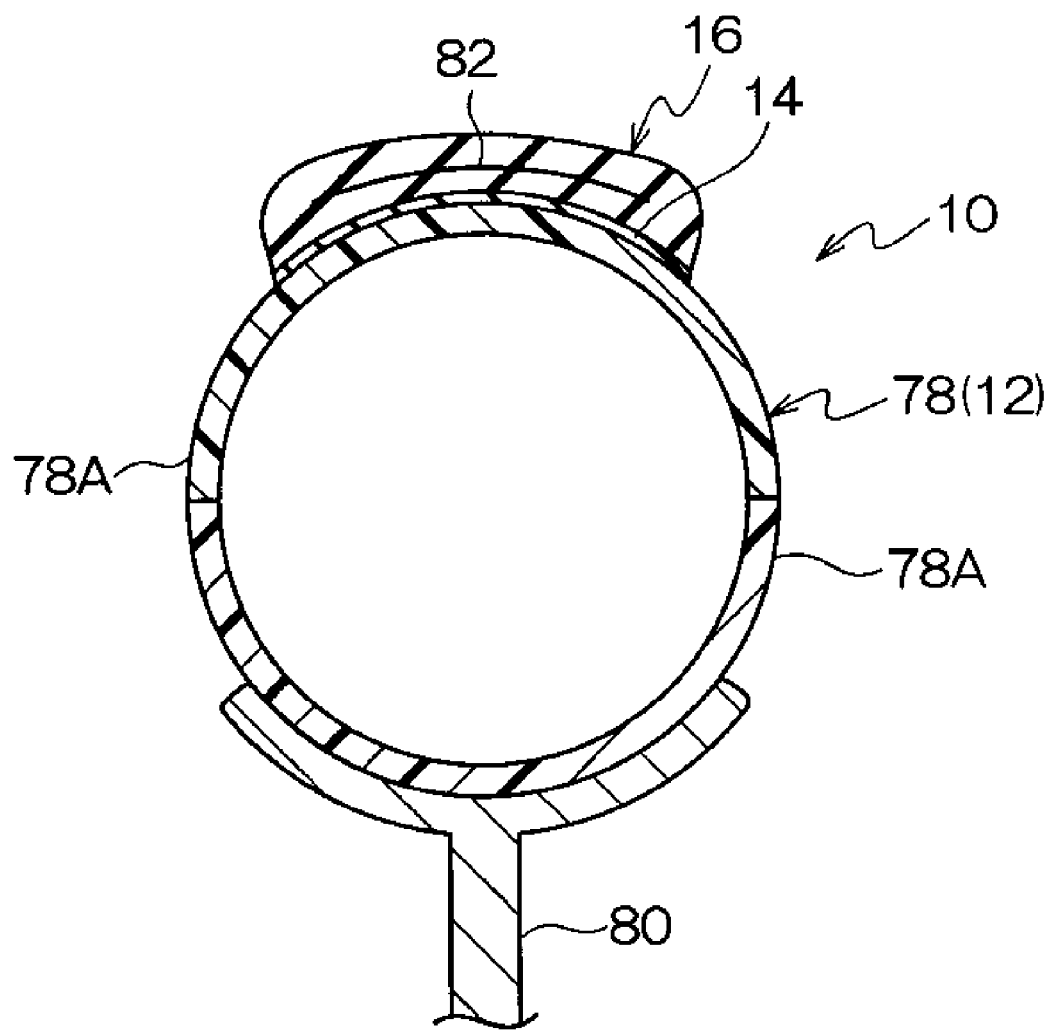
FIG. 19 is a cross-sectional view showing a tire that uses a single row of the tube body as the tire frame member.

Further, in the example shown in FIG. 19, as the tire frame member 12, one tube body 78 comprising two tube half-bodies 78A are disposed on the outer peripheral portion of the rim 80. The tread rubber 16, in which a belt layer 82 for reinforcement has been embedded, for example, is disposed on, and is vulcanized and adhered to, the outer peripheral portion of the tube body 78 via the cushion rubber 14, for example.

In the tire 10 with either of the structures shown in FIG. 17 and FIG. 19, the above-described tire manufacturing method can be used as the method of adhering the tread rubber 16 with respect to the outer peripheral portion of the tube body 78.

LIST OF REFERENCE NUMERALS

10 Tire
12 Tire Frame Member
12A Outer Peripheral Surface
14 Cushion Rubber (Unvulcanized Rubber)
16 Tread Rubber
18 Envelope
20 Provisionally Assembled Article 22 Container
38 Concavo-convex Portions
62 Side Rubber
62A Rubber Layer

The invention claimed is:

1. A tire that is manufactured by a method including:
using a thermoplastic material to form a tire frame member;
embedding and placing a cord for reinforcement being wound and extending in a tire circumferential direction, in a crown portion of the tire frame member as a reinforcing layer;
disposing a rubber layer, which is a tread-side end portion of a side rubber disposed on the side portion of the tire frame member, and is formed by extending the side rubber as far as the outer peripheral surface of the tire frame member, in at least part of a region of the outer peripheral surface of the tire frame member within which a tread rubber is adhered;
disposing unvulcanized rubber on an outer peripheral surface of the tire frame member;
further disposing the unvulcanized rubber between the tread rubber and the rubber layer, and between the tread rubber and the region of the outer peripheral surface of the tire frame member where the rubber layer is not disposed; and
performing heating in a state where the tread rubber, the unvulcanized rubber, and at least the tread rubber side of the tire frame member have been covered with an envelope to thereby adhere the tread rubber to the tire frame member,
wherein the tire frame member consists of a single reinforcing layer.

2. A tire, wherein:
a tire frame member is formed using a thermoplastic material;
a cord for reinforcement being wound and extending in a tire circumferential direction is embedded and placed in a crown portion of the tire frame member as a reinforcing layer;
cushion rubber is disposed on an outer peripheral surface of the tire frame member;
tread rubber is further disposed on a tire diameter direction outer side of the cushion rubber; and
a rubber layer, which is a tread-side end portion of a side rubber disposed on the side portion of the tire frame member, and is formed by extending the side rubber as far as the outer peripheral surface of the tire frame member, is disposed in at least part of a region of the outer peripheral surface of the tire frame member within which a tread rubber is disposed; and
the cushion rubber is disposed between the tread rubber and the rubber layer, and between the tread rubber and the region of the outer peripheral surface of the tire frame member where the rubber layer is not disposed,
wherein the tire frame member consists of a single reinforcing layer.

3. The tire according to claim 2, wherein an adhesive is disposed between the outer peripheral surface of the tire frame member and the cushion rubber.

4. The tire according to claim 2, wherein
concavo-convex portions are disposed beforehand on the outer peripheral surface of the tire frame member, and
unvulcanized rubber fits together with the concavo-convex portions after vulcanization.

* * * * *